United States Patent [19]
Wright

[11] Patent Number: 5,090,869
[45] Date of Patent: Feb. 25, 1992

[54] VARIABLE PITCH PROPELLER MODULE FOR AN AERO GAS TURBINE ENGINE POWERPLANT

[75] Inventor: William B. Wright, Leicester, England

[73] Assignee: Rolls-Royce plc, London, England

[21] Appl. No.: 507,578

[22] Filed: Apr. 11, 1990

[30] Foreign Application Priority Data

May 17, 1989 [GB] United Kingdom ............... 8911332

[51] Int. Cl.$^5$ .............................................. B63H 3/00
[52] U.S. Cl. .................................. 416/147; 416/156; 416/157 B; 416/127; 416/129
[58] Field of Search ............... 416/128, 129, 147, 154, 416/155, 156, 157 R, 157 A, 157 B, 160, 127

[56] References Cited

U.S. PATENT DOCUMENTS

| | | | |
|---|---|---|---|
| 3,893,789 | 7/1975 | Andrews | 416/160 |
| 4,643,643 | 2/1987 | Otto | 416/154 |
| 4,728,261 | 3/1988 | Wright et al. | 416/157 B |
| 4,738,589 | 4/1988 | Wright | 416/157 B |

FOREIGN PATENT DOCUMENTS 2180892 9/1985 United Kingdom .
2209371 9/1985 United Kingdom .

Primary Examiner—John T. Kwon
Attorney, Agent, or Firm—Cushman, Darby & Cushman

[57] ABSTRACT

A variable pitch propeller module includes first and second multi-bladed propellers arranged to be driven in opposite rotational directions by a reduction gear mechanism, via shafts. First and second drums are rotatably mounted on the hubs of the first and second propellers and the drums are arranged to rotate the blades of the propellers. A hydraulic motor is mounted coaxially on and rotates with the second propeller, the hydraulic motor being arranged to drive the drums by via a pitch change gear assembly. A hydraulic fluid feed tube extends coaxially through the reduction gear mechanism and both propellers to supply hydraulic fluid to the hydraulic motor. An annular sleeve is positioned coaxially on the tube. The hydraulic fluid feed tube has passages and the sleeve has passages which are aligned to allow hydraulic fluid to flow to the hydraulic motor to vary the pitch of both blades. The feed tube and sleeve are moved axially to control the flow of hydraulic fluid to the hydraulic motor.

19 Claims, 6 Drawing Sheets

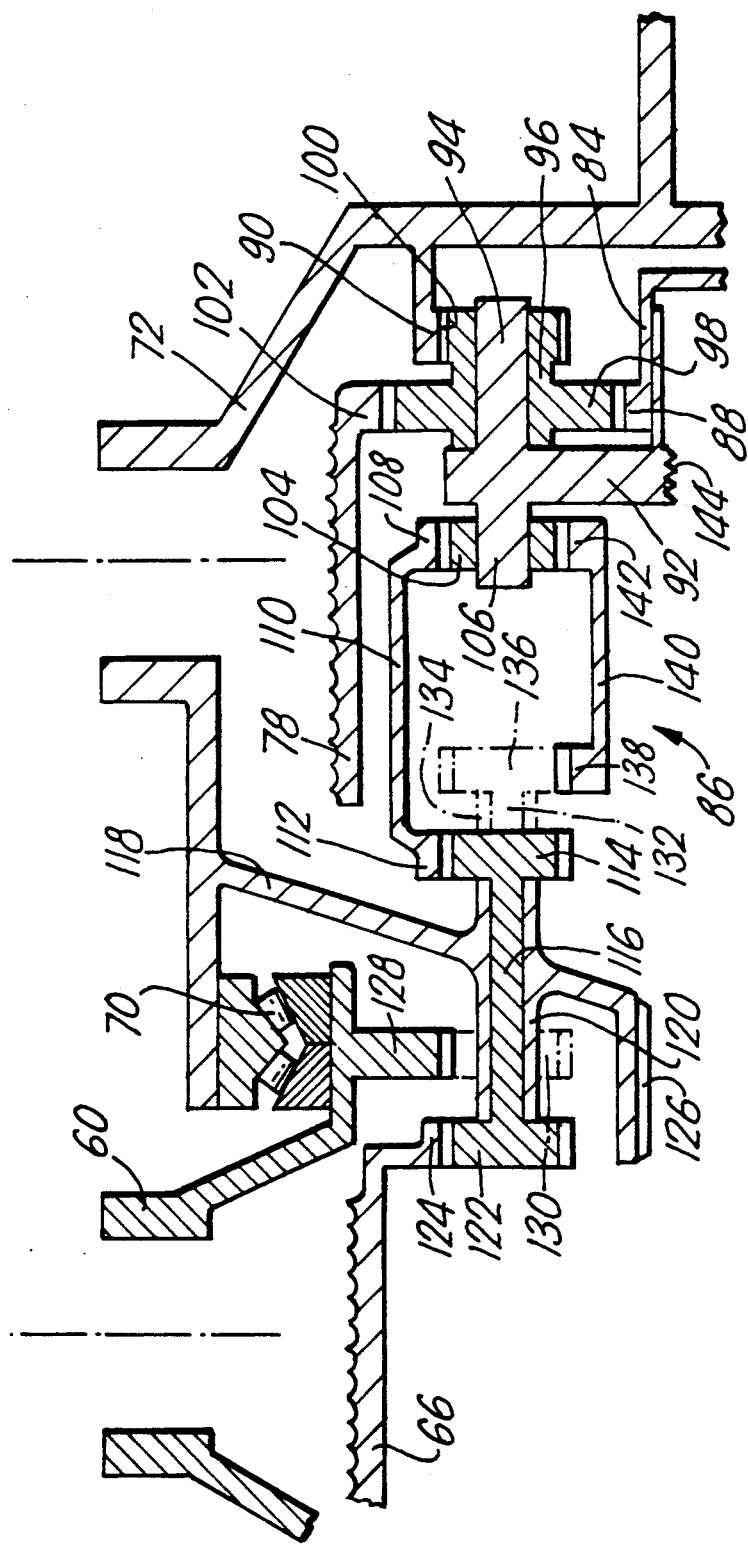

VARIABLE PITCH PROPELLER MODULE FOR AN AERO GAS TURBINE ENGINE POWERPLANT

The present invention relates to a propeller module for aero gas turbine engine powerplants particularly for a propeller module comprising two contra-rotating propellers.

The present invention seeks to provide a novel variable pitch propeller module for an aero gas turbine engine powerplant which has a single pitch change control to operate the pitch change for two contra-rotating propellers.

Accordingly the present invention provides a propeller module for a gas turbine engine powerplant comprising a first multi-bladed propeller and a second multi-bladed propeller, the first and second multi-bladed propellers being coaxial and driven in contra-rotation by coaxial shaft means via reduction gear means, first and second pitch change means for the first and second multi-bladed propellers, the first pitch change means comprising first drive means rotatably mounted on the hub of the first multi-bladed propeller and arranged to rotate the blades of the first multi-bladed propeller about their longitudinal axes, the second pitch change means comprising second drive means rotatably mounted on the hub of the second multi-bladed propeller and arranged to rotate the blades of the second multi-bladed propeller about their longitudinal axes, a pitch change gear assembly being arranged to drive the first and second pitch change means to change the pitch of the blades of the first and second multi-bladed propeller, a hydraulic motor being mounted coaxially on the second multi-bladed propeller, the hydraulic motor being arranged to drive the pitch change gear assembly, a hollow hydraulic fluid feed member extending coaxially on the common axis of the reduction gear means, the first multi-bladed propeller and the second multi-bladed propeller to supply hydraulic fluid to the hydraulic motor, a sleeve positioned on and enclosing the hydraulic fluid feed member, the hydraulic fluid feed member and sleeve having passages formed therein for the flow of hydraulic fluid, the hydraulic fluid feed member and sleeve being relatively movable axially to control the alignment of the passages of the hydraulic fluid feed member and the sleeve so as to control the flow of hydraulic fluid to the hydraulic motor.

The hydraulic fluid feed member may be secured to and rotates with the second multi-bladed propeller.

The hydraulic fluid feed member may be tubular, the sleeve is annular, the hydraulic fluid feed member being arranged coaxially with the first and second multi-bladed propellers.

The annular sleeve may have a splined inner surface portion, the hydraulic fluid feed member has a splined outer surface portion, the splined inner surface portion of the annular sleeve cooperates with the splined outer surface portion of the hydraulic fluid feed member such that the annular sleeve rotates with the hydraulic fluid feed member.

The pitch change gear assembly may comprise a first sun gear driven by the hydraulic motor, a plurality of first planet gears meshing with and driven by the first sun gear, the first planet gears meshing with and driving a first annulus gear connected to the first pitch change means, the first planet gears being rotatably mounted on a planet carrier, a plurality of second planet gears rotatably mounted on the planet carrier, the second planet gears meshing with a second annulus gear connected to the hub of the second multi-bladed propeller, a plurality of third planet gears rotatably mounted on the planet carrier, the third planet gears meshing with and driving a third annulus gear, the third annulus gear being arranged to drive the second pitch change means.

The third planet gears may mesh with a second sun gear, the second sun gear being arranged to be driven by the hub of the first bladed propeller.

The third annulus gear may be drivingly connected to a fourth annulus gear, the fourth annulus gear meshes with and drives a plurality of first star gears, the first star gears being rotatably mounted on the hub of the second multi-bladed propeller by a plurality of first spindles extending axially therethrough, a plurality of second star gears being rotatably mounted on the hub of the second multi-bladed propeller by the first spindles, the second star gears meshing with and driving a fifth annulus gear connected to the second pitch change means.

The second sun gear may be drivingly connected to a third sun gear, the third sun gear meshes with and is driven by a plurality of fourth star gears, the fourth star gears being rotatably mounted on the hub of the second multi-bladed propeller by a plurality of second spindles extending axially therethrough, a plurality of third star gears being rotatably mounted on the hub of the second multi-bladed propeller by the second spindles, the third star gears meshing with and being driven by a sixth annulus gear connected to the hub of the first multi-bladed propeller.

The annular sleeve may have a threaded outer surface portion, the carrier member has a threaded inner surface portion, the threaded outer surface portion of the annular sleeve cooperates with the threaded inner surface portion of the carrier member so that relative rotation between the carrier member and the hub of the second multi-bladed propeller causes the annular sleeve to rotate relative to the carrier member and to move axially relative to the hydraulic fluid feed member such that the passages of the hydraulic fluid feed member and the annular sleeve are moved out of alignment to terminate the supply of hydraulic fluid to the hydraulic motor.

The reduction gear means may be positioned axially between the gas turbine engine powerplant and the first and second multi-bladed propellers.

The reduction gear assembly may comprise a sun gear driven by the shaft means, a plurality of planet gears meshing with and driven by the sun gear, the planet gears being rotatably mounted in and driving a planet carrier member, the planet gears meshing with and driving an annulus gear, the planet gears driving the planet carrier member and annulus gear in contra-rotation.

The annulus gear may drive the first multi-bladed and the planet carrier member drives the second multi-bladed propeller.

A second reduction gear means may drive the shaft means.

The gas turbine engine powerplant may comprise a first gas turbine engine and a second gas turbine engine, the first and second gas turbine engines being arranged such that their longitudinal rotational axes are parallel, each gas turbine engine driving one of a pair of parallel output shafts, the output shafts being arranged to drive the second reduction gear means.

The first drive means may comprise a first drum positioned coaxially within and rotatably mounted on the hub of the first multi-bladed propeller, the first drum having a first recirculating ball screw and nut adapted to rotate the blades of the first multi-bladed propeller.

The second drive means may comprise a second drum positioned coaxially within and rotatably mounted on the hub of the second multi-bladed propeller, the second drum having a second recirculating ball screw and nut adapted to rotate the blades of the second multi-bladed propeller.

The hydraulic motor may be a swash plate motor.

The swash plate motor may comprise two swash plates arranged back to back in a casing, the swash plates being secured to the casing, a barrel member being positioned coaxially within the casing and axially between the swash plates, the barrel member having a plurality of pistons arranged to move axially to act on the swash plates, the shaft being secured to the barrel member, the axial movement of the pistons against the swash plates by the supply of hydraulic fluid causes rotation of the barrel member and shaft.

The first multi-bladed propeller may be rotatably mounted on a cantilevered structure, the second multi-bladed propeller is rotatably mounted on the first multi-bladed propeller.

The present invention will be more fully described by way of example with reference to the accompanying drawings, in which:

FIG. 6 is a longitudinal cross-sectional view to an enlarged scale showing pitch change gears forming part of the pitch change mechanism shown in FIG. 2.

Figure 1:
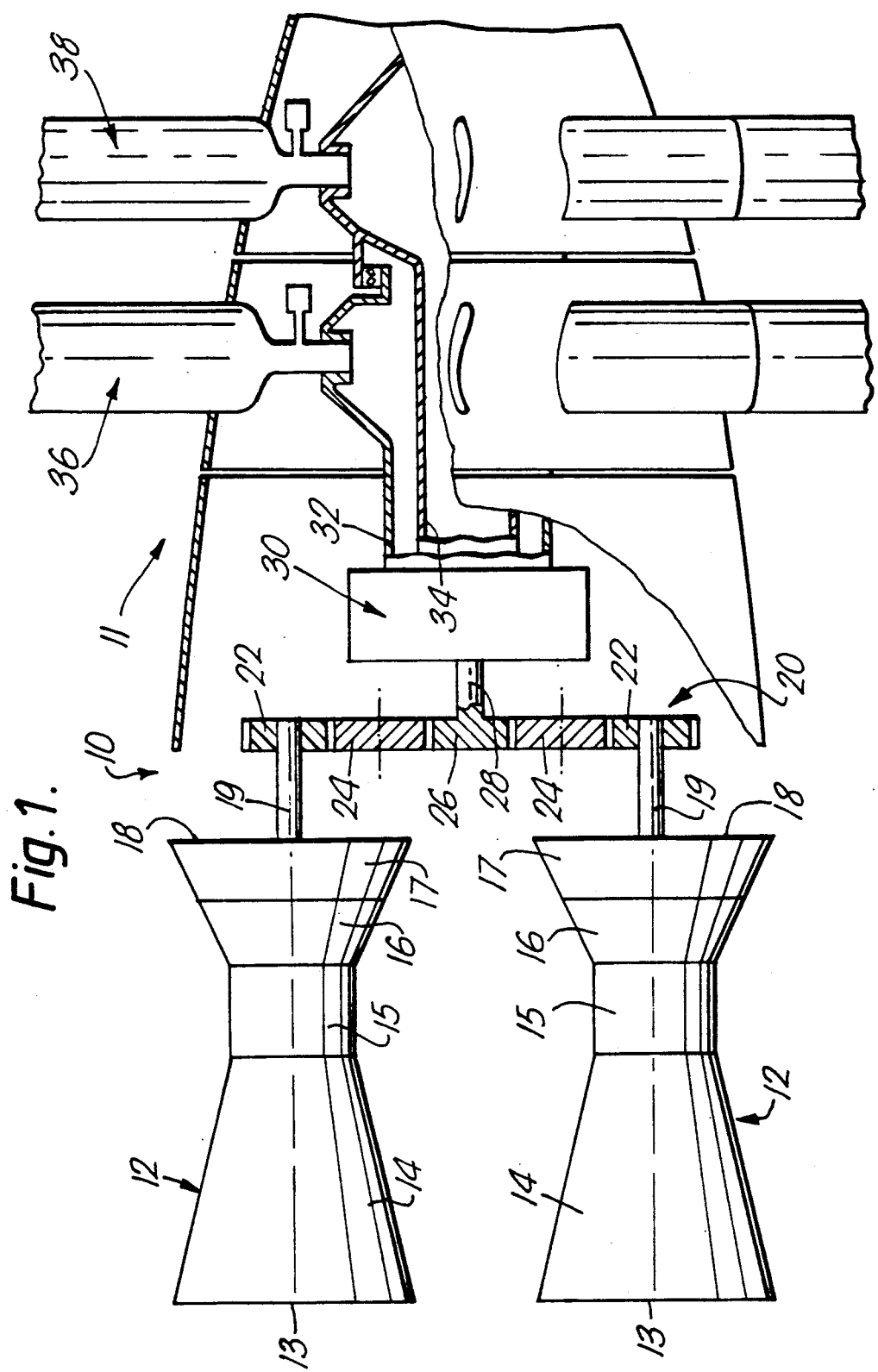
FIG. 1 is a plan view of a variable pitch propeller module and aero gas turbine engine power plant according to the present invention.
Figure 2:
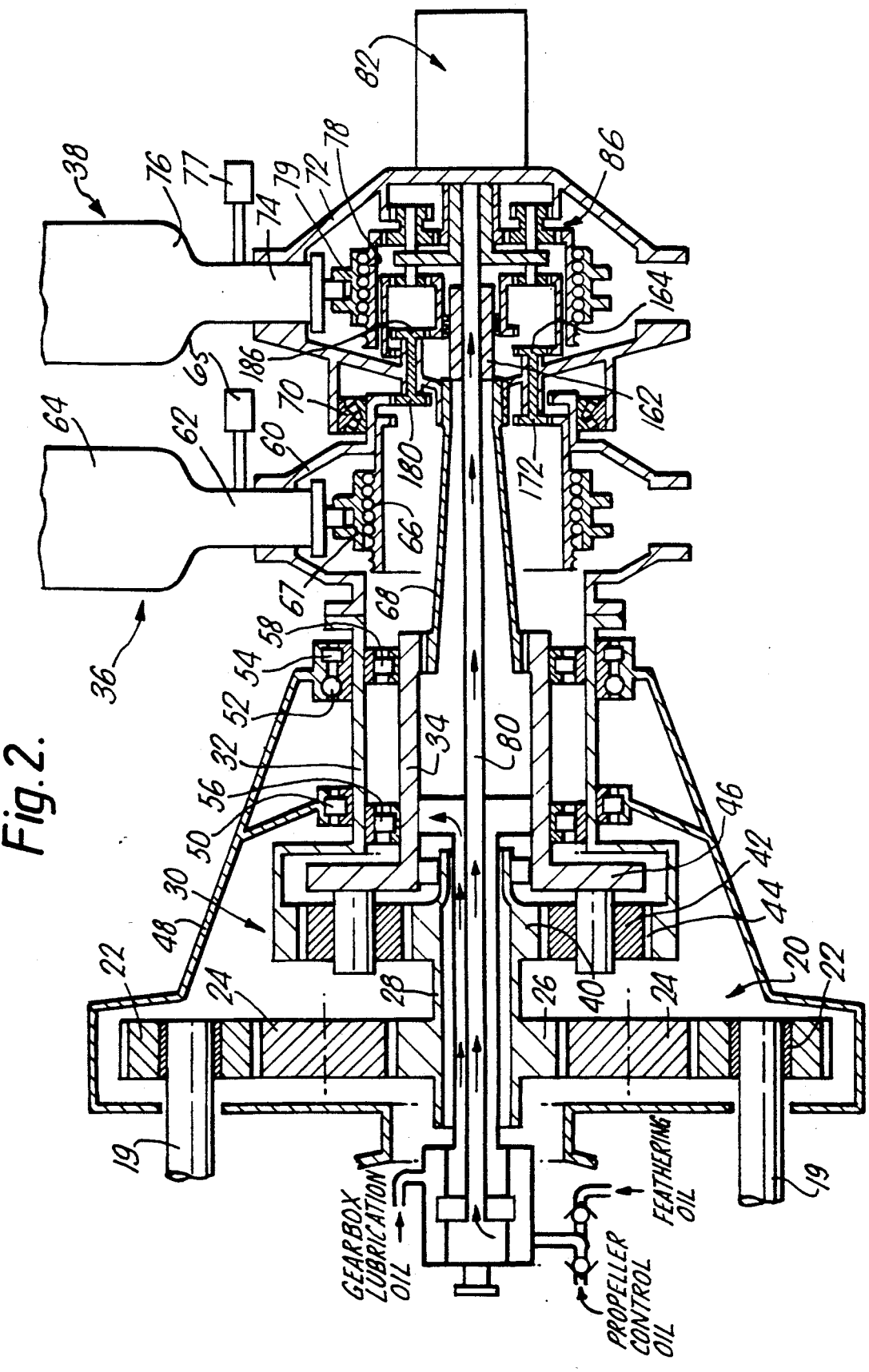
FIG. 2 is a longitudinal cross-sectional view through the propeller module, a reduction gear assembly to drive the propeller module and a pitch change mechanism.

A propeller module for an aero gas turbine engine powerplant 10 is shown in FIGS. 1 and 2, and in this example is a pusher type turbo-propeller aero gas turbine engine powerplant. The powerplant 10 comprises two aero gas turbine engines 12 arranged such that their longitudinal rotational axes are substantially parallel.

Each of the aero gas turbine engines 12 comprises in axial flow series an intake 13, a compressor section 14, a combustion section 15, a turbine section 16, a power turbine 17 and an exhaust 18. The compressor section 14 may comprise a single compressor or may comprise a low pressure compressor and a high pressure compressor, similarly the turbine section 16 may comprise a single turbine or a high pressure turbine and a low pressure turbine.

Each power turbine 17 drives output shafts 19 which extend in a downstream direction and drive a second reduction gear assembly 20. The second reduction gear assembly 20 comprises a pair of pinions 22, a pair of idler gears 24 and a single gear 26. Each shaft 19 is connected to and drives a respective one of the pair of pinions 22, and each idler gear 24 meshes with one of the pinions 22 and with the gear 26. The axes of rotation of all the gears in the second reduction gear are substantially parallel.

The pinions 22 contain a free wheel clutch device so that the propellers can be driven from one engine only, with the other power turbine stationary, in the event of failure of one engine.

The gear 26 is connected to and drives a shaft 28 which in turn drives a first reduction gear assembly 30. The first reduction gear assembly 30 comprises a sun gear 40, a plurality of planet gears 42, an annulus gear 44, and a planet carrier 46. The planet gears 42 are rotatably mounted in and drive the planet carrier 46. The sun gear 40 meshes with, and drives the planet gears 42, and the planet gears 42 mesh with and drive the annulus gear 44. The planet gears 42 drive the planet carrier 46 and the annulus gear 44 in opposite directions, and the annulus gear 44 drives a first multi-bladed propeller 36 via a first shaft 32 and the planet carrier 46 drives a second multi-bladed propeller 38 via a second shaft 34,68.

The first multi-bladed propeller 36 is rotatably mounted on a cantilevered structure 48, which extends in a downstream direction from and is secured to the aero gas turbine engines, by bearings 50,52 and 54 between the first shaft 32 and the cantilevered structure 48. Bearings 50 and 54 are roller bearings, whereas bearing 52 is a ball bearing. The second shaft 34 is rotatably mounted within the first shaft 32 by roller bearings 56 and 58, and the second multi-bladed propeller 38 is rotatably mounted on the first multi-bladed propeller 36 by taper roller bearings 70.

The first reduction gear assembly 30 and the second reduction gear assembly 20 are positioned axially between the downstream end of the gas turbine engines 12 and the first and second multi-bladed propellers 36,38.

The first multi-bladed propeller 36 has a hub 60 which carries a plurality of propeller blades 64, the propeller blades 64 are rotatably mounted in the hub 60 by means of pivotal root portions 62. Each blade 64 has a counterbalance weight 65. A first drum 66 is positioned coaxially within the hub 60 of the first multi-bladed propeller 36 and is rotatable relative to the hub 60. The first drum 66 has a recirculating ball thread and a nut 67 is mounted on the thread of the drum 66. The nut 67 has a plurality of circumferentially arranged equi-spaced actuators, one for each blade, which are secured to the pivotal root portions 62 of the blades 64. Movement of the nut 67 along the drum 66 by relative rotation between the drum 66 and hub 60 causes the propeller blades 64 to be rotated to vary the pitch of the propeller blades 64.

The second multi-bladed propeller 38 has a hub 72 which carries a plurality of propeller blades 76, the propeller blades 76 are rotatably mounted in the hub 72 by means of pivotal root portions 74. Each blade 76 has a counterbalance weight 77. A second drum 78 is positioned coaxially within the hub 72 of the second multi-bladed propeller 38 and is rotatable relative to the hub 72. The second drum 78 has a recirculating ball thread and a nut 79 is mounted on the thread of the drum 78. The nut 79 has a plurality of circumferentially arranged equi-spaced actuators, one for each blade, which are secured to the pivotal root portions 74 of the blades 76. Movement of the nut along the drum 78 by relative rotation between the drum 78 and the hub 72 causes the propeller blades 76 to be rotated to vary the pitch of the propeller blades 76.

An oil feed tube 80 extends coaxially through the gear 26, the shaft 28, sun gear 40 and the second shaft 34 to an hydraulic motor 82 positioned coaxially with and secured to the second multi-bladed propeller 38. The oil feed tube 80 is arranged to supply hydraulic fluid to the hydraulic motor 82 to initiate variation of the pitch of the propeller blades of both the first and second multi-bladed propellers 36,38.

The hydraulic motor 82 is arranged to drive an annular drive shaft 84 which changes the pitch of the first and second multi-bladed propellers 36,38 via a pitch change gear assembly 86. The pitch change gear assembly 86 is shown more clearly in FIG. 6, and the drive shaft 84 has a first sun gear 88 which meshes with and drives a plurality of double planet gear members 96. Each planet gear member 96 has a first planet gear 98 which meshes with the sun gear 88 and a second planet gear 100 which meshes with a second annulus gear 90 secured to the hub 72 of the second multi-bladed propeller 38. The planet gear members 96 are rotatably mounted on a planet carrier member 92 by a plurality of spindles 94 which are secured to and extend in an axially downstream direction from the carrier member 92. The first planet gear 98 of each planet gear member 96 also meshes with and drives a first annulus gear 102 secured to the second drum 78 so as to vary the pitch of the second multi-bladed propeller.

The planet carrier member 92 also has a plurality of spindles 106 which are secured to and extend axially in an upstream direction from the carrier member 92. A plurality of third planet gears 104 are rotatably mounted on the planet carrier member 92 by the spindles 106, one third planet gear 104 is mounted on each spindle 106. The third planet gears 104 mesh with and drive a third annulus gear 108, the third annulus gear 108 is mounted on a first annular member 110 together with a fourth annulus gear 112. The fourth annulus gear 112 meshes with a plurality of first star gears 114 which are rotatably mounted on a carrier member 118 which forms a part of the hub 72 of the second multi-bladed propeller 38. A plurality of first spindles 116 extend axially through first apertures 120 in the carrier member 118, and one of the first star gears 114 is secured to the axially downstream end of each first spindle 116. A plurality of second star gears 122 are rotatably mounted on the carrier member 118, and one of the second star gears 122 is secured to the axially upstream end of each first spindle 116. The second star gears 122 mesh with and drive a fifth annulus gear 124 secured to the first drum 66 so as to vary the pitch of the first multi-bladed propeller 36. The hub 60 of the first multi-bladed propeller 60 has a sixth annulus gear 128 which meshes with a plurality of third star gears 130 which are rotatably mounted on the carrier member 118. A plurality of second spindles 132 extend axially through second apertures 134 in the carrier member 118, and one of the third star gears 130 is secured to the axially upstream end of each second spindle 132. A plurality of fourth star gears 136 are rotatably mounted on the carrier member 118, and one of the fourth star gears 136 is secured to the axially downstream end of each second spindle 132. The fourth star gears 136 mesh with a third sun gear 138 which is mounted on a second annular member 140 together with a second sun gear 142. The second sun gear 142 meshes with the third planet gears 104.

The first spindles 116 are equi-circumferentially spaced and the second spindles 132 are equi-circumferentially spaced, but the first and second spindles are arranged alternately circumferentially.

The first spindles 116, and second spindles 132 are of equal length but are arranged so that their ends are axially spaced so that the fifth annulus gear 124 and second star gears 122 mesh in a plane axially spaced from a plane in which the sixth annulus gear 128 and third star gears 130 mesh. Similarly the fourth annulus gear 112 and first star gears 114 mesh in a plane spaced axially from a plane in which the third sun gear 138 and fourth star gears 136 mesh. This arrangement is necessary because the diameters of the first, second, third and fourth star gears are equal.

The planet carrier member 92 is provided with a threaded inner bore 144 which will be discussed later.

In operation the pitch change gear assembly 86 transmits the pitch change signals to the first and second multi-bladed propellers 36,38. The gear 90 is fixed relative to the hub 72 of the second multi-bladed propeller 38, and if the first sun gear 88 is not rotated there is no relative movement between the first sun gears 88 and the second annulus gear 90 and therefore the first and second planet gears 98,100 do not rotate about the spindles 94, and the planet carrier member 92 does not rotate relative to the second multi-bladed propeller 38. Therefore the second drum 78 remains static relative to the hub 72 of the second multi-bladed propeller 38 and the pitch of the second multi-bladed propeller remains fixed. The four sets of star gears, are carried by the hub 72 of the second multi-bladed propeller 38 and, are rotating with the second multi-bladed propeller 38 in the opposite direction to the first multi-bladed propeller 36. The sixth annulus gear 128 drives the third and fourth star gears 130,136 and the star gears 136 in turn drive the second and third sun gears 142,138. The second sun gear 142 drives the third planet gears 104, to rotate about the spindles 106, which in turn drives the third and fourth annulus gears 108,112. The fourth annulus gear 112 drives the first and second star gears 114,122, and the star gears 122 drive the fifth annulus gear 124 to drive the drum 66. The gears 128,130,136,138 and 142 are arranged in conjunction with gears 108,112,114,122 and 124 to maintain the pitch of the first multi-bladed propeller fixed, this is achieved by arranging these gears to drive the first drum 66 at the same speed and in the same directions as the hub 60 of the first multi-bladed propeller 36.

When the first sun gear 88 is rotated by the hydraulic motor 82, the first and second planet gears 98,100 rotate about the spindles 94, and because the second annulus gear 90 is fixed relative to the second hub 72, the rotation of the first and second planet gears 98, 100 causes the planet carrier 92 to rotate relative to the hub 72 of the second multi-bladed propeller 38. The rotation of the first planet gear 98 causes the first annulus gear 102 and second drum 78 to rotate relative to the hub 72 to adjust the pitch of the blades 76 of the second multi-bladed propeller 38. The rotation of the planet carrier 92 relative to the second multi-bladed propeller 38 causes the third planet gear 104 to rotate with an additional rotational component which is transmitted by the third and fourth annulus gears 108,112, the first and second star gears 114,122 to the fifth annulus gear 124. The additional rotational component transmitted by the second star gear 122 causes the fifth annulus gear 124 and first drum 66 to rotate relative to the hub 60 to adjust the pitch of the blades 64 of the first multi-bladed propeller.

Figure 3:
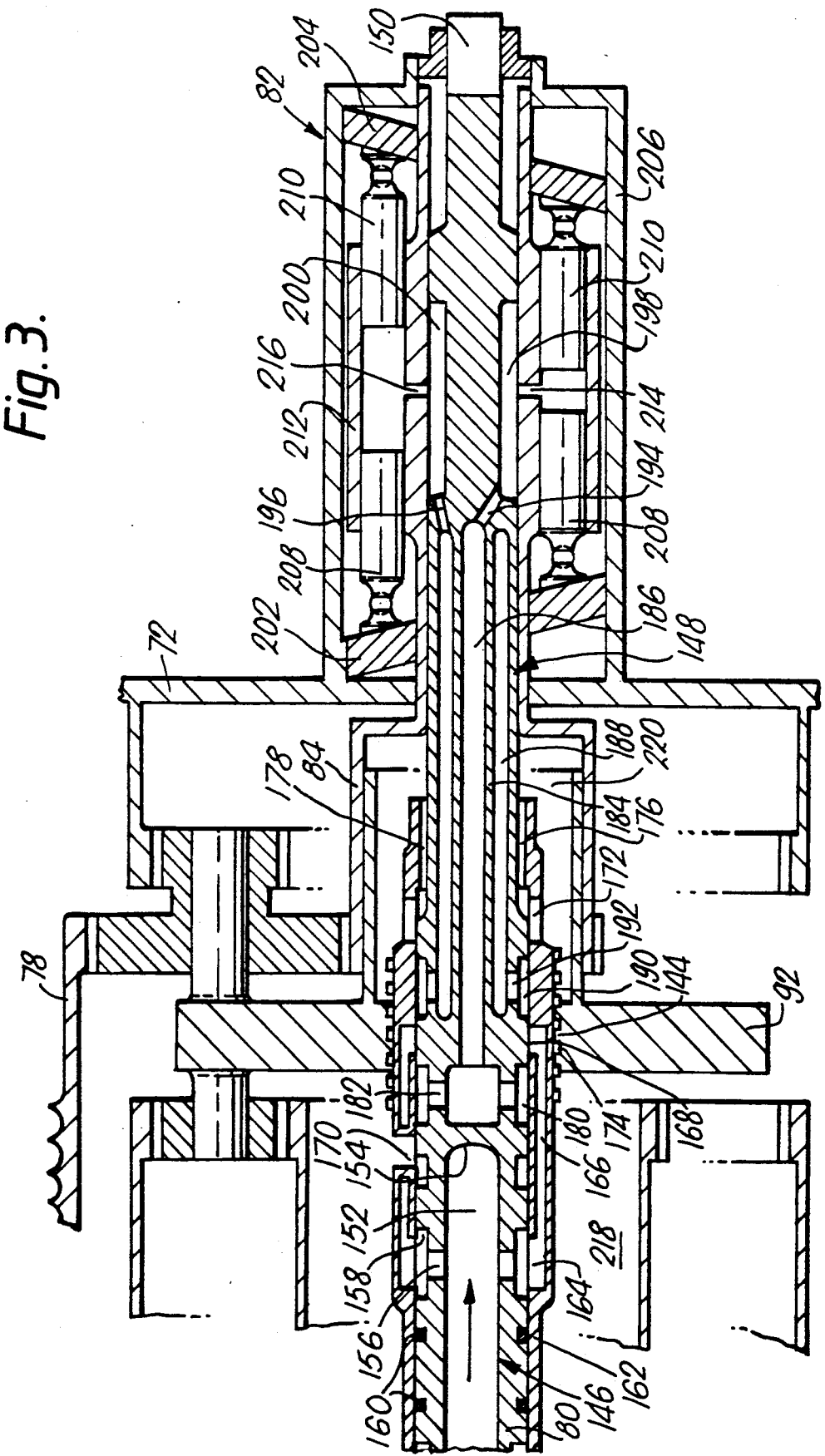
FIG. 3 is a longitudinal cross-sectional view to an enlarged scale showing a hydraulic motor forming part of a pitch change mechanism shown in FIG. 2.
Figure 4:
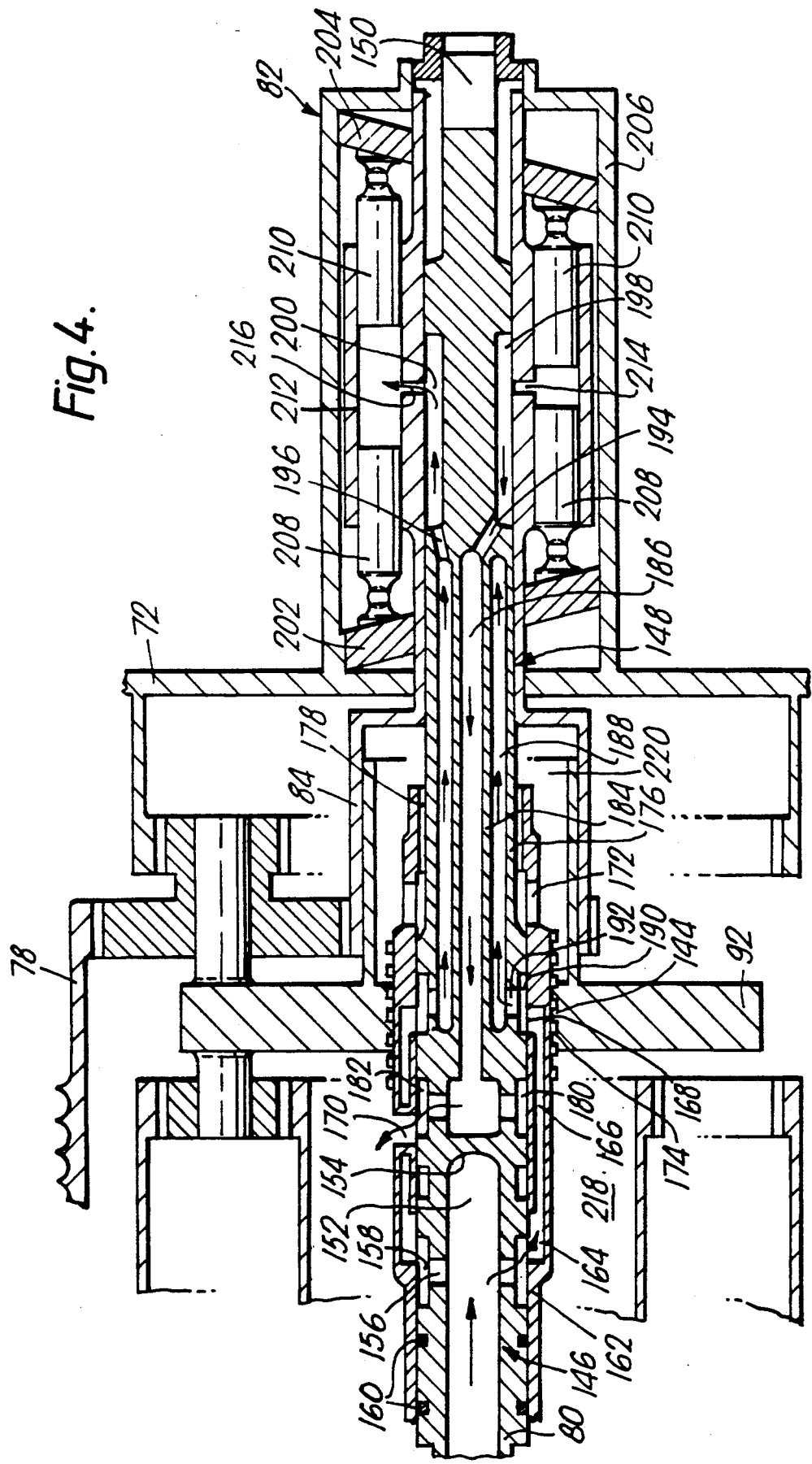
FIG. 4 is a longitudinal cross-sectional view similar to FIG. 3 showing operation of the pitch change mechanism to change the pitch of the propellers in one direction.
Figure 5:
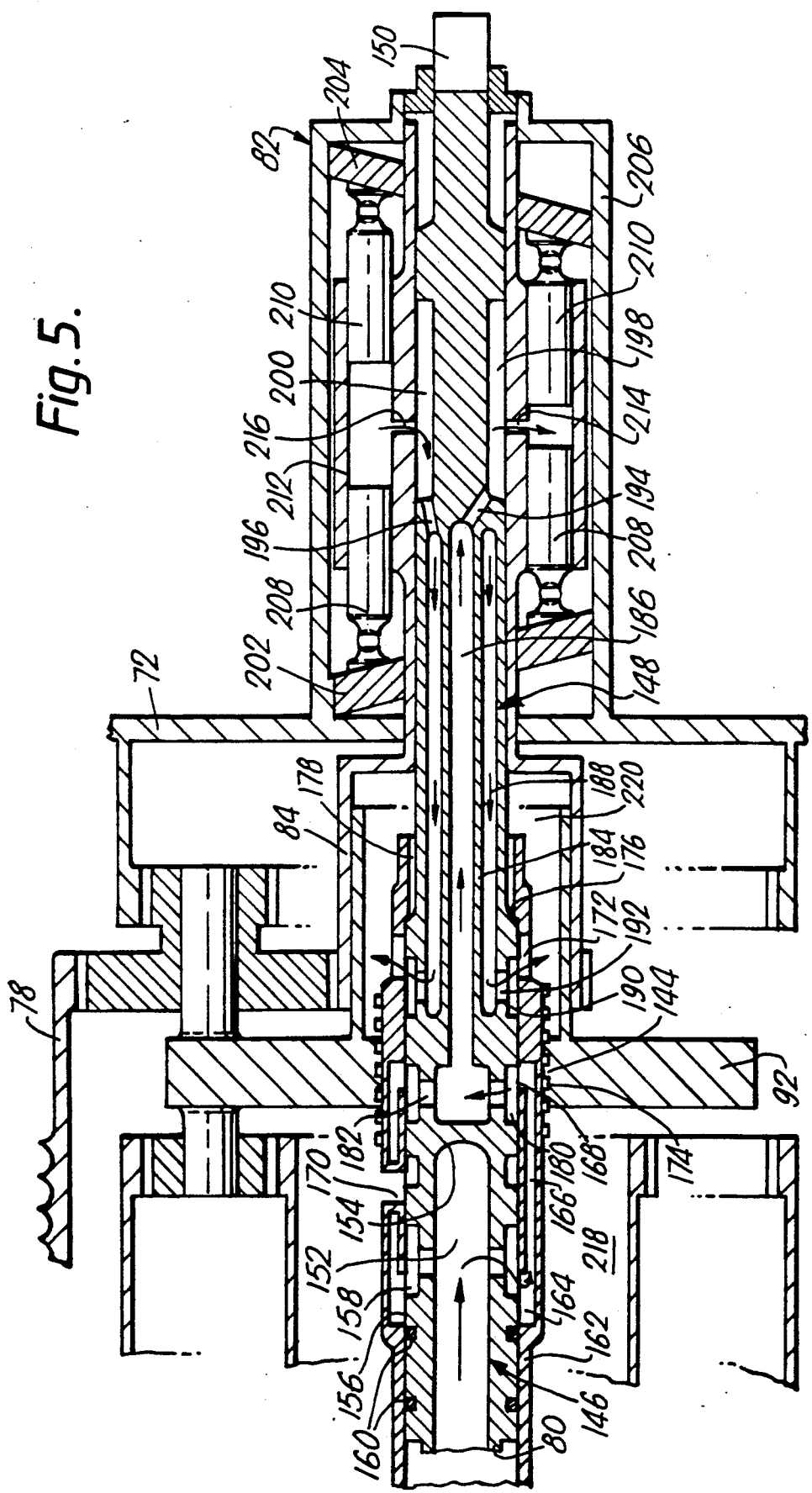
FIG. 5 is a longitudinal cross-sectional view similar to FIG. 3 showing operation of the pitch change mechanism to change the pitch of the propellers in the opposite direction.

The oil feed tube 80 and the hydraulic motor 82 are shown more clearly in FIGS. 3 to 5, the oil feed tube 80 comprises a first axially upstream portion 146, a second axially downstream portion 148 and a keyed connection 150 which rotationally secures the oil feed tube 80 to the case of the hydraulic motor 82 so that the oil feed tube 80 rotates with the second multi-bladed propeller 38 but which allows the oil feed tube 80 to move axially with respect to hydraulic motor 82.

The first portion 146 of the oil feed tube 80 is hollow and has a single first passage 152 extending axially therethrough. The first portion 146 of the oil feed tube 80 is closed at its downstream end 154 and a plurality of apertures 156 extend radially through the oil feed tube 80 to interconnect the first passage 152 with a first annular port 158 formed on the outer surface of the oil feed tube 80. An annular sleeve 162 is positioned coaxially around the oil feed tube 80 and has an inner diameter substantially the same as the outer diameter of the oil feed tube 80. The oil feed tube 80 has two sealing rings 160 to form an oil seal between the oil feed tube 80 and the upstream end of the annular sleeve 162. The annular sleeve 162 has first annular port 164 on its inner surface which is connected to a second annular port 168 by an axially extending passage 166 formed in the sleeve 162. One or more first apertures 170 extend radially through the annular sleeve 162 to interconnect the inner surface and outer surface, at a position axially between the first and second ports 164 and 168. A plurality of second apertures 172 extend radially through the annular sleeve 162 at a position axially downstream of the second port 168. The outer surface of the annular sleeve 162 has a portion 174 which is threaded and which cooperates with the threaded inner bore 144 of the planet carrier member 92. The downstream end of the portion annular sleeve 162 has a splined inner surface 176 which cooperates with a splined outer surface 178 of the oil feed tube 80 so that the annular sleeve 162 rotates with the oil feed tube 80 and second multi-bladed propeller 38. The second portion 148 of the oil feed tube 80 has a first annular port 180 on its outer surface immediately downstream of the closed downstream end 154 of the first portion 146 of the oil feed tube 80 and this is interconnected with a second passage 186 extending axially through the oil feed tube 80 by a plurality of second apertures 182. A tubular member 184 is positioned coaxially within the second portion 148 of the oil feed tube 80 to separate the second passage 186 from a third annular passage 188 extending coaxially through the oil feed tube 80 between the tubular member 184 and the inner surface of the oil feed tube 80. The second portion 148 of the oil feed tube 80 has a second annular port 190 on its outer surface immediately downstream of the first annular port 180, and is interconnected to the third passage 188 by a plurality of third apertures 192. The downstream end of the second portion 148 of the oil feed tube 80 extends coaxially into the annular drive shaft 84 and contacts the inner surface of a portion of the drive shaft 84. The downstream end of the second passage 186 is closed but is interconnected with a part annular third port 198 on the outer surface of the oil feed tube 80, by an aperture 194, and the downstream end of the third annular passage 188 is closed but is interconnected with a fourth part annular port 200 by an aperture 196. The part annular ports 198 and 200 supply hydraulic fluid to the hydraulic motor 84.

The hydraulic motor 82 is a swash plate type motor and comprises two swash plates 202 and 204 arranged back to back in a common casing 206, and the swash plates are fixed to the casing so that they will not rotate relative to casing 206 and hub 72. A barrel member 212 is positioned coaxially within the casing 206 axially between the swash plates, and is arranged to drive the shaft 84 which drives the pitch change gear assembly 86.

The barrel member 212 has a plurality of pistons 208 and 210 which are arranged to move axially to act on the swash plates 202 and 204 respectively. The barrel member 212 has apertures 214 and 216 which allow hydraulic fluid to be supplied to the pistons from the oil feed tube 80 and return hydraulic fluid from the pistons to the oil feed tube 80.

When hydraulic fluid is supplied to the pistons 208, 210, the pistons move axially outwards away from each other and because the swash plates are fixed, the barrel member 212 and shaft 84 are caused to rotate and so drive the pitch change gear assembly 86.

In operation to vary the pitch of the blades 64,76 of the first and second multi-bladed propellers 36,38, the oil feed tube 80 is moved axially in either an upstream or a downstream direction dependent upon the direction of pitch change required. The FIG. 3 arrangement shows the oil feed tube 80 in a position when hydraulic fluid is not supplied to the hydraulic motor 82. If the oil feed tube 80 is moved in an axially upstream direction, as shown in FIG. 4, the sleeve 162 remains stationary, relative to the hub 72, and oil is supplied from the first passage 152 to the hydraulic motor 82 via the apertures 156 and first annular port 158 of the first portion 146 of the oil feed tube 80, the first annular port 164, the passage 166 and second annular port 168 of the sleeve 162, the second annular port 190, the third apertures 192, third annular passage 188, apertures 196 and port 200 of the second portion 148 of the oil feed tube 80 and apertures 216 in the barrel 212 to the pistons 208,210. The oil pushes the pistons 208,210 apart, as discussed above, to drive the barrel 212 and shaft 84 in one rotational direction to vary the pitch of the blades of the first and second multi-bladed propellers. After the oil has pushed the pistons 208,210 apart it returns to the oil supply via the aperture 214 in the barrel 212, the third port 198, aperture 194, the second passage 186, apertures 182 and first annular port 180 of the second portion 148 of the oil feed tube 80, apertures 170 in the annular sleeve 162 to an annular oil return passage 218 coaxially surrounding the oil feed tube 80.

As a result of the rotation of the shaft 84 relative to the hub 72, the planet carrier member 92 is also rotated relative to the hub 92 and to the oil feed tube 80. This causes the annular sleeve 162, which is positioned radially between the planet carrier member 92 and the oil feed tube 80 and has a threaded connection 144,174 with the planet carrier 92 and a splined connection 176,178 with the oil feed tube, to move axially along the oil feed tube 80 in an upstream direction, so as to position the annular sleeve 162 such that it terminates the supply of oil to the hydraulic motor 80 to maintain the new blade pitch setting.

Similarly if the oil feed tube 80 is moved in an axially downstream direction, as shown in FIG. 5, the sleeve 162 remains stationary relative to the hub 72, and oil is supplied from the first passage 152 to the hydraulic motor 82 via the apertures 156 and first annular port 158 of the first portion 146 of the oil feed tube 80, the first annular port 164, the passage 166 and second annular port 168 of the sleeve 162, the first annular port 180, the second apertures 182, the second passage 186, aperture 194 and third port 198 of the second portion 148 of the oil feed tube 80 and aperture 214 in the barrel 212 to the pistons 208, 210.

The oil pushes the pistons 208,210 apart, to drive the barrel 212 and shaft 84 in opposite rotational direction to vary the pitch of the blades of the first and second multi-bladed propellers.

After the oil has pushed the pistons 208,210 apart it returns to the oil supply via the aperture 216 in the barrel 212, the fourth port 200, the aperture 196, the third annular passage 188, apertures 192 and second annular port 190 of the second portion 148 of the oil feed tube 80, apertures 172 in the sleeve 162 to an annular chamber 220. The chamber 220 is defined by the sleeve 162, oil feed tube 80, planet carrier 92 and shaft 84. The oil supplied into the chamber 220 flows through the threaded connection 144,174 to the annular oil return passage 218.

The annular sleeve 162 again moves axially along the oil feed tube 80 in a downstream direction, so as to position the sleeve 162 such that it terminates the supply of oil to the hydraulic motor 80 to maintain the new blade pitch setting.

It can be seen that the pitch of both propellers is controlled by a single pitch change control unit i.e. the oil feed tube 80 which moves axially, the axial position of the oil feed tube determines the pitch. Only a single oil feed tube is required to supply a hydraulic motor which varies the pitch of two contra-rotating propellers. The oil feed tube may also be used for a feathering oil supply. There is a relatively small diameter oil seal between the oil feed tube and the annular sleeve. The position of the oil feed tube may be used as a form of B control feed back. The use of a single controller gives simplicity to the design.

It may be possible to use other suitable types of hydraulic motor to drive the shaft 84, instead of the back to back swash plate motor.

Although the embodiment is shown in use with a pair of gas turbine engines, it may be used with a single gas turbine engine driving the first and second multi-bladed propellers in which instance the second reduction gear assembly would not be required.

I claim:

1. A propeller module for a gas turbine engine powerplant comprising a first multi-bladed propeller and a second multi-bladed propeller, the first and second multi-bladed propellers being arranged coaxially and being driven in contra-rotation by coaxial shaft means
   the first multibladed propeller having a plurality of propeller blades and a hub, the propeller blades being rotatably mounted on the hub about their longitudinal axes,
   a first pitch change means comprising a first drive means rotatably mounted on the hub of the first multi-bladed propeller arranged to rotate the blades of the first multi-bladed propeller,
   the second multi-bladed propeller having a plurality of propeller blades and a hub, the propeller blades being rotatably mounted on the hub about their longitudinal axes,
   a second pitch change means comprising a second drive means rotatably mounted on the hub of the second multi-bladed propeller arranged to rotate the blades of the second multi-bladed propeller,
   a pitch change gear assembly being arranged to drive the first and second pitch change means to change the pitch of the blades of the first and second multi-bladed propellers,
   the pitch change gear assembly comprising at least one set of planet gears and a planet carrier, the planet carrier having a threaded inner surface portion,
   a hydraulic motor being mounted coaxially on the second multi-bladed propeller, the hydraulic motor being arranged to drive the pitch change gear assembly,
   a hollow hydraulic fluid feed member extending coaxially on the common axis of the first multi-bladed propeller and the second multi-bladed propeller to supply hydraulic fluid to the hydraulic motor, the hydraulic fluid feed member having passages formed therein for the flow of hydraulic fluid,
   a sleeve being positioned on and enclosing the hydraulic fluid feed member, the sleeve having passages formed therein for the flow of hydraulic fluid, the sleeve having a threaded outer surface portion which engages the threaded inner surface portion of the planet carrier,
   the hydraulic fluid feed member and the sleeve being relatively movable axially to control the alignment of the passages of the hydraulic fluid feed member and the sleeve so as to control the flow of hydraulic fluid to the hydraulic motor,
   the hydraulic fluid feed member and the sleeve being interengaged so that relative rotation is not allowed.

2. A propeller module as claimed in claim 1 in which the hydraulic fluid feed member is secured to and rotates with the second multi-bladed propeller.

3. A propeller module as claimed in claim 1 in which the hydraulic fluid feed member is tubular, the sleeve is annular.

4. A propeller module as claimed in claim 3 in which the annular sleeve has a splined inner surface portion, the hydraulic fluid feed member has a splined outer surface portion, the splined inner surface portion of the annular sleeve cooperates with the splined outer surface portion of the hydraulic fluid feed member such that the annular sleeve rotates with the hydraulic fluid feed member.

5. A propeller module as claimed in claim 1 in which the pitch change gear assembly comprises a first sun gear driven by the hydraulic motor, a plurality of first planet gears meshing with and driven by the first sun gear, the first planet gears meshing with and driving a first annulus gear connected to the first pitch change means, the first planet gears being rotatably mounted on the planet carrier, a plurality of second planet gears rotatably mounted on the planet carrier, the second planet gears meshing with a second annulus gear connected to the hub of the second multi-bladed propeller, a plurality of third planet gears rotatably mounted on the planet carrier, the third planet gears meshing with and driving a third annulus gear, the third annulus gear being arranged to drive the second pitch change means.

6. A propeller module as claimed in claim 5 in which the third annulus gear is drivingly connected to a fourth annulus gear, the fourth annulus gear meshes with and drives a plurality of first star gears, the first star gears being rotatably mounted on the hub of the second multi-bladed propeller by a plurality of first spindles extending axially therethrough, a plurality of second star gears being rotatably mounted on the hub of the second multi-bladed propeller by the first spindles, the second star gears meshing with and driving a fifth annulus gear connected to the second pitch change means.

7. A propeller module as claimed in claim 6 in which the third planet gears mesh with a second sun gear, the second sun gear being arranged to be driven by the hub of the first bladed propeller.

8. A propeller module as claimed in claim 7 in which the second sun gear is drivingly connected to a third sun gear, the third sun gear meshes with and is driven by a plurality of fourth star gears, the fourth star gears being rotatably mounted on the hub of the second multi-bladed by a plurality of second spindles extending axially therethrough, a plurality of third star gears being rotatably mounted on the hub of the second multi-bladed propeller by the second spindles, the third star gears meshing with and being driven by a sixth annulus gear connected to the hub of the first multi-bladed propeller.

9. A propeller module as claimed in claim 5 in which the threaded outer surface portion of the sleeve cooperates with the threaded inner surface portion of the planet carrier so that relative rotation between the planet carrier and the hub of the second multi-bladed propeller causes the sleeve to rotate relative to the planet carrier and to move axially relative to the hydraulic fluid feed member such that the passages of the hydraulic fluid feed member and the annular sleeve are moved out of alignment to terminate the supply of hydraulic fluid to the hydraulic motor.

10. A propeller module as claimed in claim 1 in which the shaft means drives the first and second multi-bladed propellers via a reduction gear means positioned axially between the gas turbine engine powerplant and the first and second multi-bladed propellers.

11. A propeller module as claimed in claim 10 in which the reduction gear assembly comprises a sun gear driven by the shaft means, a plurality of planet gears meshing with and driven by the sun gear, the planet gears being rotatably mounted in and driving a planet carrier member, the planet gears meshing with and driving an annulus gear, the planet gears driving the planet carrier member and annulus gear in contra-rotation.

12. A propeller module as claimed in claim 11 in which the annulus gear drives the first multi-bladed propeller and the planet carrier member drives the second multi-bladed propeller.

13. A propeller module as claimed in claim 10 in which a second reduction gear means drives the shaft means.

14. A propeller module as claimed in claim 13 in which the gas turbine engine powerplant comprises a first gas turbine engine and a second gas turbine engine, the first and second gas turbine engines being arranged such that their longitudinal, rotational axes are parallel, each gas turbine engine driving one of a pair of parallel output shafts, the output shafts being arranged to drive the second reduction gear means.

15. A propeller module as claimed in claim 1 in which the first drive means comprises a first drum positioned coaxially within and rotatably mounted on the hub of the first multi-bladed propeller, the first drum having a first recirculating ball screw and nut adapted to rotate the blades of the first multi-bladed propeller.

16. A propeller module as claimed in claim 1 in which the second drive means comprise a second drum positioned coaxially within and rotatably mounted on the hub of the second multi-bladed propeller, the second drum having a second recirculating ball screw and nut adapted to rotate the blades of the second multi-bladed propeller.

17. A propeller module as claimed in claim 1 in which the hydraulic motor is a swash plate motor.

18. A propeller module as claimed in claim 17 in which the swash plate motor comprises two swash plates arranged back to back in a casing, the swash plates being secured to the casing, a barrel member being positioned coaxially within the casing and axially between the swash plates, the barrel member having a plurality of pistons arranged to move axially to act on the swash plates, the shaft being secured to the barrel member, the axial movement of the pistons against the swash plates by the supply of hydraulic fluid causes rotation of the barrel member and shaft.

19. A propeller module as claimed in claim 1 in which the first multi-bladed propeller is rotatably mounted on a cantilevered structure the second multi-bladed propeller is rotatably mounted on the first multi-bladed propeller.

* * * * *